United States Patent [19]
Lipke et al.

[11] Patent Number: 4,974,809
[45] Date of Patent: Dec. 4, 1990

[54] ICE MOULD

[76] Inventors: Cecil W. Lipke; Vivienne Lipke, both c/- Lot 16 Sandy Creek Road, Yatala Q. 4207, Australia

[21] Appl. No.: 362,396
[22] PCT Filed: May 6, 1988
[86] PCT No.: PCT/AU88/00129
  § 371 Date: May 22, 1989
  § 102(e) Date: May 22, 1989
[87] PCT Pub. No.: WO88/08946
  PCT Pub. Date: Nov. 17, 1988

[30] Foreign Application Priority Data
  May 7, 1987 [AU] Australia ................. PI1787

[51] Int. Cl.⁵ .................... F25C 1/22; B29C 33/38
[52] U.S. Cl. ............................ 249/82; 249/55; 249/111; 249/112; 249/134; 249/166; 249/167
[58] Field of Search .............. 249/55, 82, 111, 112, 249/113, 134, 165–167; 62/356

[56] References Cited
U.S. PATENT DOCUMENTS

| | | | |
|---|---|---|---|
| 2,352,083 | 6/1944 | Detjen | 249/55 |
| 2,633,006 | 3/1953 | Taylor | 249/82 |
| 2,722,111 | 11/1955 | Taylor | 249/112 |
| 2,939,299 | 6/1960 | Sherbloom | 249/55 |
| 3,321,932 | 5/1967 | Orphey, Jr. | 249/111 |
| 3,684,234 | 8/1972 | Clinebell | 249/82 |
| 4,206,899 | 6/1980 | Whitehead | 249/55 |
| 4,315,037 | 2/1982 | Kelly | 62/356 |
| 4,669,271 | 6/1987 | Noel | 249/55 |
| 4,817,911 | 4/1989 | Infanti | 249/82 |

Primary Examiner—James C. Housel
Attorney, Agent, or Firm—Wood, Phillips, Mason, Recktenwald & VanSanten

[57] ABSTRACT

A mould assembly for moulding ice sculpture having (i) complementary mould members (1,2) of low thermal conductivity material, the complementary mould members being releasably mated together via complementary peripheral flanges (3,4) secured together by nuts (8,14) and bolts (19,11), defining an open topped mould cavity; (ii) a water impervious flexible mould liner (18) conforming to the interior of the cavity and including a split region (19) around at least part of its periphery, having mating portions, each of the mating portions having extended (20,21) lips adapted to be sealingly clamped togehter between adjacent mould members; (iii) a thermally insulating cover adapted to close the open top of the mould cavity, wherein the improvement lies in the provision of: (a) perforations (15) thorough the mould members at regions corresponding to protuberant parts and (b) providing thermal insulation (16) to the mould assembly at regions corresponding to narrow parts of the ice sculpture to decrease the rate of freezing of the narrow parts.

29 Claims, 3 Drawing Sheets

ICE MOULD

This invention relates to an apparatus and method for producing ice sculpture and in particular relates to an ice mould and method of using it in order to produce clear ice sculpture by moulding.

In the restaurant and hotel trade, it has been the mark of the higher quality establishments to be able to provide ice sculptures as the centerpiece of a set table. The exclusivity of ice sculpture has revolved around the fact that such centerpieces have had to be carved from solid ice by skilled artisans.

In order to reduce the high cost associated with the labour of such skilled artisans, attempts have been made to produce ice sculpture by freezing water in moulds. To this end, solid moulds of steel and aluminum have been employed, with less than satisfactory results.

Firstly, by the nature of production of ice from water, rigid moulds are unsatisfactory since they do not allow for the expansion of the ice upon freezing, a characteristic of water in its phase change from liquid to solid. Where a shape to be moulded has narrow and/or protuberant portions, such moulds have tended towards cracking and resultant breakage at the narrow or protuberant portions.

Several attempts have been made to overcome such problems, with limited success being attained to date. One approach has been directed to allowing for the expansion of ice by incorporating a large base area in an inverted rigid mould. However this was found not to completely eliminate the inherent problems outlined above.

Another approach to moulding ice has been through the use of flexible moulds which are resilient enough to provide for the expansion of the ice. For example, International Patent Application No WO8701183 corresponding to Danish Application No. 3655/85 discloses multiple bag like moulds for ice blocks. Whilst this construction is suitable for small simple objects, it is unsuitable for massive objects such as centerpiece ice sculpture since the weight of the liquid water tends to deform the flexible mould and results in loss of detail for the ice sculpture.

U.S. Pat. No. 4,206,899 describes a flexible mould supported within a rectangular box. The flexible mould described has a wall of sufficient wall thickness to prevent the abovementioned distortion. However the thick-walled mould is particularly difficult to peel off the frozen sculpture, apart from being expensive. In particular, this construction of mould results in ice sculpture containing cracks which are caused by stress concentration. These cracks, as has been found in substantially all of the moulds previously proposed, detract from the appearance of the sculpture as well as promoting a tendency to structural weakness at protuberant or narrow sections of the ice sculpture.

U.S. Pat. No. 3,684,234 describes an expandable form for supporting a pliable container, the combination comprising an open topped mould for ice. The form is constructed and arranged to allow outward flexing to permit expansion of the ice and to assist in demoulding. A removable cover is provided which retains the container and permits stacking of the forms. The air space at the top of the assembly provides insulation for the top of the water, preventing this region of the water from freezing first and "locking in" the underlying water. However, ice sculpture produced with this apparatus still has the deficiency of cracks at narrow or protuberant parts with resultant poor appearance and structural strength.

U.S. Pat. No. 4,669,271 extends the principles of U.S. Pat. No. 3,684,234 and describes an apparatus comprising two contoured sidewalls releasably joined at flat peripheral flanges to define an enclosure having a top opening bordened by a horizontal rim. A thin flexible envelope, contoured to conform with the interior of the enclosure is inserted into the enclosure in a manner such that the mouth opening of the envelope is draped across the rim. The insulated cover again prevents the top surface of the water from freezing first, resulting in ice mouldings of improved clarity. Demoulding is facilitated by removing the cover, separating the sidewalls and preferably peeling the envelope off the ice sculpture.

The description of U.S. Pat. No. 4,669,271 further states that the mould is preferably constructed of fiberglass reinforced plastic material by spraying a fast-setting catalysed resin and fiberglass mixture onto a form coated with release agent. The fiberglass incorporates the design to be moulded as a negative impression.

The contoured, thin flexible water-impermeable envelope is fabricated by applying repeated coatings of an elastomeric material such as latex upon an object, and then peeling the cured, integral envelope from the object. Where the object is irregular in that portions protrude relative to the bulk, the envelope is pleated to enable expansion of the envelope to facilitate peeling from the frozen sculpture.

The thermally insulative cover is of uniform thickness with a flat lower surface, and completely covers the horizontal rim and opening. The cover is preferably of wood or closed cell foam. The cover is preferably weighted to provide a firm seal against the mouth of the envelope.

Although this mould construction represents a significant improvement over the prior art, there remains a significant deficiency inherent in the construction, that is, where the soulpture has narrow or protuberant parts, these tend to accumulate stresses on freezing of the water, resulting in cloudiness and/or cracking. Whilst the ice mould of U.S. Pat. No. 4,669,271 provides clear ice in the bulk of the sculpture, it retains this deficiency in common with the prior art.

It is thus an object of the present invention to provide an apparatus for and method of the production of ice sculpture by moulding, which apparatus and method substantially eliminates stress concentration and cracking at narrow or protuberant regions of the sculpture and thereby substantially overcomes the deficiencies of the prior art.

As used hereinafter the term "narrow" or "narrow portion" is to be taken to mean a portion of the ice sculpture having a cross sectional dimension that is relatively narrow or reduced dimensions compared to adjacent parts of the ice sculpture.

Accordingly the invention provides a mould assembly for moulding ice sculpture having (i) at least two complementary mould members defining an open topped mould cavity.

(ii) a water impervious flexible mould liner conforming to the interior of the cavity and (iii) a thermally insulating cover adapted to close the open top of the cavity wherein the improvement lies in the provision of means to vary the rate of heat transfer through the mould members between different areas of the mould members such that the relative rate of freezing of the water adjacent the different areas is controlled.

The complementary mould members may be of any material consistent with its use in forming a mould. However, it is preferred to make the complementary mould members of a material having relatively low thermal conductivity in order to provide effective control of the rate of freezing within the mould. It is particularly preferred to use a curable fibre reinforced resin as the mould member material, this material being chosen for its strength and ease of working up, as well as its desirable heat transfer properties.

The mould members may each be provided with a peripheral flange, the flanges being complementary to one another to facilitate assembly of the mould to form the open topped mould cavity. The mould members may be secured in assembly by the provision of fixing members operating to hold the peripheral flanges in abutment.

In one particularly preferred embodiment of the present invention at least some of the fixing means are resilient such that the mould members may be pushed apart in response to the characteristic expansion of the ice.

The mould members may each bear a top flange which, when the members are assembled, form a rim disposed about the opening of the assembly. This rim provides rigidity to the assembly as well as providing a retaining means for the mould liner.

The water impervious, flexible mould liner may be of latex or any other flexible material consistent with the present application. Suitable materials are those which are water impermeable at least when cured, and capable of taking the negative impression of the sculpture. Natural rubber latex is the preferred material for its ease of working up, flexibility down to low temperatures and durability.

It has been found that a compounded, pre-vulcanized natural rubber latex produced by REVERTEX INDUSTRIES (AUST) PTY LIMITED and sold under the trademark MR REVULTEX is particularly suitable for use in liners of the present invention. This latex has the following properties:

| Total Solids Content | 60–61% |
| Ammonia Content | 0.6% (approx 360 meg/L) |
| pH | 10.5 |
| Modulus 700% extension | 120 kg/cm$^2$ |
| Tensile Strength | 300 kg/cm$^2$ |
| Elongation at Break | 900% |

Preferably, the liner is made with a split or division from the region of the open top at least part way down the liner, the split corresponding in position to the partition line between the mould members.

This split assists in the demoulding process by eliminating the need to grossly stretch the liner, resulting in superior liner life. In one preferred form of the invention, the liner is provided with lips or edge portions along the edges of the split which may be clamped between the mould members such that the lips of the liner are held in sealing engagement. If necessary a food grade sealant may also be used to ensure a water tight seal, with it being preferred to use margarine for this purpose. For most common shapes, it is sufficient for the mould to be split down one side from the open top to the apex of the inverted assembly.

The liner is preferably provided with a bead or flange about its open top, this bead or flange serving to locate the liner against the top flange of the assembled mould members.

Where the sculpture has deep reentrants which would otherwise hinder demoulding, the preferred latex mould liner may have an embedded insert of a polymeric foam, the polymeric foam having a lower heat capacity than the latex. The purpose of this insert is to facilitate demoulding by reaching its glass transition or softening temperature quickly upon removal of the mould assembly from the freezer. If the reentrant were moulded with latex only, the thick latex at this region would take considerable time to reach temperature at which the sculpture could be demoulded. However, provision of the foam insert allows demoulding of sculptures with reentrant portions to occur in about the same time as sculptures without reentrants.

Hereinafter, the term "reentrant" or "reentrant region" is taken to mean a region of the ice sculpture which is bounded by a surface such that a corresponding part of a rigid mould member conforming to that surface is incapable of being removed from it, either by virtue of not being divisible at that region to effect removal, or by virtue of the dimensions or shape of the reentrant being such that the opening or entrance to the reentrant is insufficient to permit passage of the corresponding part of the rigid mould member.

In order to prevent the sculpture freezing from the open top of the mould first, there is provided a insulative cover which closes the open top of the mould assembly. The cover preferably rests on the locating flange of the liner, thereby assisting positive location of the locating flange on the top flange of the assembly. The resilient nature of the locating flange of the liner provides a seal between the cover and the top flange, thereby improving the insulative function of the cover. At the same time, any build up of gases or displacement of excess water can escape by lifting the cover off the locating flange of the liner.

The cover may be of any insulative material consistent with its function, with it being particularly preferred to use polystyrene or other rigid polymer foam.

It is particularly preferred to use a cover having a depression in its lower surface, such as may be formed by making the cover from a substantially annular lower portion conforming to the top flange, and an upper substantially flat portion closing the annulus. The thickness of the annulus then defines the desirable depression. The depression is desired to prevent the cover from contacting and adhering to the top surface of the ice on expansion. It is particularly desirable when the cover is made from relatively fragile foam material such as polystyrene, since removal of cover which is stuck to the ice may result in bits of the cover breaking off and remaining on the ice.

The improvement of the present invention resides in providing the mould assembly with means serving to vary the rate of heat transfer through the walls of the mould assembly. It has been found that if the narrow or protuberant portions of the ice sculpture are encouraged to freeze before the bulk of the sculpture, the stresses which accumulate to cause cracking in the prior art moulds are relieved into the still liquid bulk and are thereby dispersed. Similarly, if a sculpture has a narrow "waist" region such as an hourglass or seahorse shape, then stress concentration can occur by this "waist" freezing right through first and dividing the bulk of the liquid water into two bodies. It has been found that providing thermal insulation at the narrow region of the mould assembly prevents premature freezing through this region allowing the bulk of the liquid to freeze progressively as one body and thereby avoiding the concentration of stresses at the narrow portions. In prior art moulds and in particular for metal moulds, the rate of heat transfer is such that the ice forms at all points of the inner surface of the mould at the same time, reducing the opportunity for stress relief and causing the aforementioned stress accumulation.

In the present invention, varying the rate of heat transfer, and therefore freezing, such that protuberant portions of the sculpture freeze before the bulk may be effected by any practical means such as varying the thickness of the mould, varying the material used at the protuberant portions of the mould members or by applying lower temperatures to the protuberant portions. However, for simplicity of manufacture and use it is preferred that the rate of heat transfer be modified by providing the mould members with perforations therethrough. The perforations may be of any size up to a diameter where the liner bulges through them. The perforations are suitably of greatest total area at the protuberant regions of the mould members directly exposing the mould liner at these regions to the freezing atmosphere of the freezer. The size and/or area density of the perforations may then taper off to the less protuberant or bulk regions of the mould members. Of course the maximum area of the perforations obtainable will be a combined function of the size and number of perforations in the region and the structural strength of the material of the mould members at that region.

Similarly, many means of insulating the narrow regions of a mould assembly to prevent premature freezing are contemplated. For example, the insulation may be achieved by externally applying to the mould an insulative material. Suitable insulative materials include flexible polymeric foams, glass fibre batts, self blowing and curing rigid polyurethane foams and the like. Alternatively, the insulation may be incorporated into the substance of the mould member itself during manufacture thereof, or may be incorporated in the substance of the liner. Where the insulation is incorporated into the liner however, it is desirable to use a flexible insulative plastic foam of lower volumetric heat capacity than the latex of the liner such that the insulative material softens quickly to assist in demoulding of the ice sculpture.

The invention will be further described with reference to embodiments thereof as illustrated in the accompanying drawings.

Figures 1, 2:
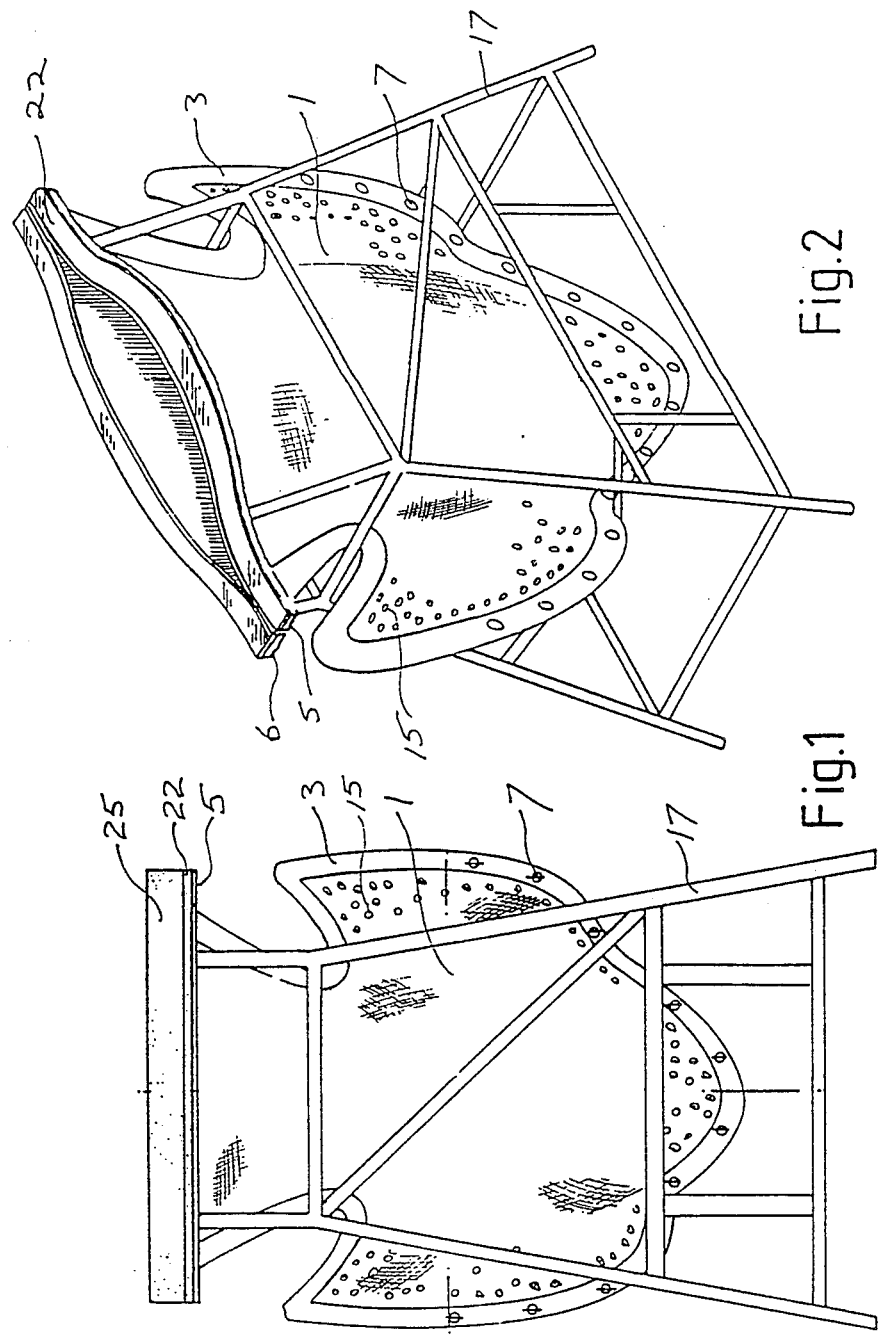
FIG. 1 is an elevation of a mould assembly in accordance with the present invention.
FIG. 2 is a perspective view of the mould assembly of FIG. 1, with the insulating cover removed for clarity.
Figure 3:
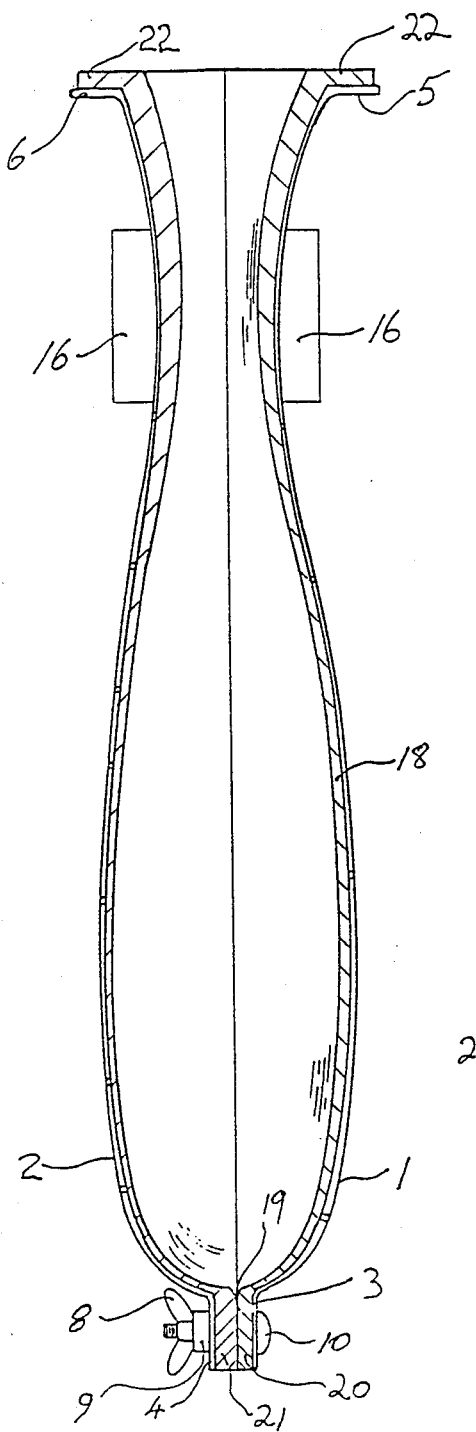
FIG. 3 is a section through an arbitrary mould in accordance with the present invention, illustrating the use of insulation on narrow sections.
Figure 4:
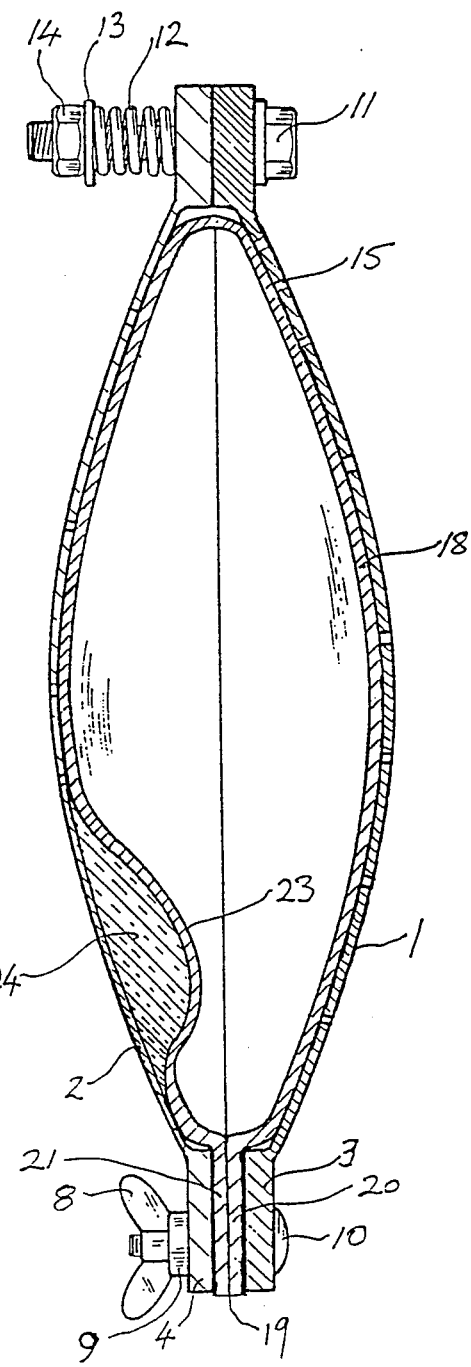
FIG. 4 is a section through an arbitrary mould in accordance with the present invention, illustrating the split liner of a preferred mould assembly.
Figure 5:
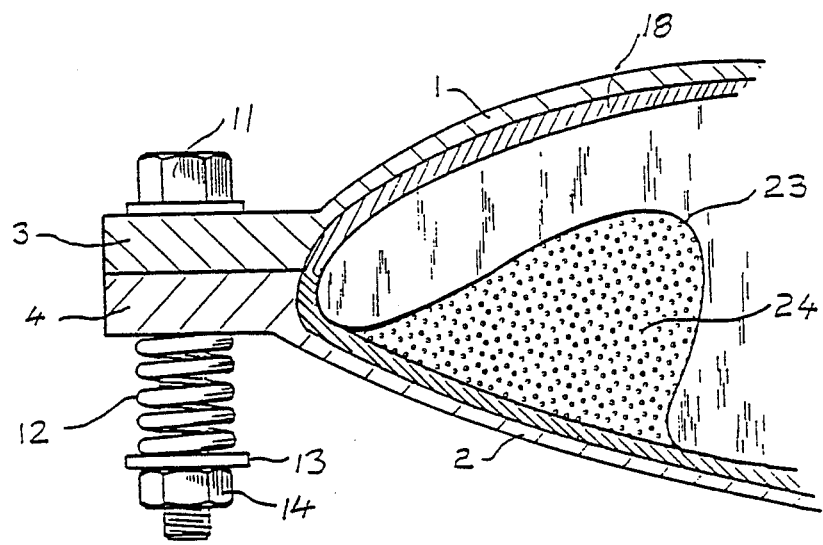
FIG. 5 is a section through an arbitrary mould in accordance with the present invention, illustrating the use of foam of low heat capacity to permit the moulding of reentrant forms.

In the figures, complementary rigid mould members 1 and 2 are provided with peripheral mating flanges 3 and 4 respectively and in assembly provide an open topped mould.

Around the top edge of mould members 1 and 2 are top flanges 5 and 6 respectively, the top flanges in assembly providing a continuous substantially horizontal rim about the open top of the mould assembly. The peripheral mating flanges 3 and 4 are provided with complementary holes 7 providing passage for either rigid fixing means consisting of a nut 8, washer 9 and bolt 10, or resilient fixing means consisting of an elongate bolt 11, spring 12, washer 13 and nut 14.

Where the sculpture to be moulded is protuberant, the mould members 1 and 2 are provided with perforations 15 serving to increase the rate of heat transfer out of the mould assembly at these regions and thereby causing the protuberant portions of the sculpture to freeze first. Where the sculpture is narrow, the mould members 1 and 2 are provided with an insulative material 16 serving to retard the rate of heat transfer out of the mould assembly at this region and thereby retard the freezing of the narrow portion relative to the rest of the sculpture. The assembly is supported in its upright position in a cradle 17.

Within the assembled mould members 1 and 2 is a flexible mould liner 18. The mould liner 18 is split or divided at 19 part way around its periphery corresponding in position of the rigid fixing means. The split at 19 is provided with lips 20 and 21 adapted to be clamped between the peripheral flanges 3 and 4 of the mould members 1 and 2 to provide a watertight seal of the split 19 in use.

The mould liner 18 is provided at its upper bounds with a flange 22 adapted to lie flat against the top flanges 5 and 6 of the mould members 1 and 2 respectively.

At reentrant regions 23 of the ice sculpture the mould liner 18 conforms in surface to the reentrant region 23, the mould liner 18 being back-filled with a foam insert 24, the foam insert 24 being of lower volumetric heat capacity relative to that of the liner 18 such that it softens and becomes deformable upon warming (in less time than a corresponding insert of latex would soften,) in order to reduce demoulding times. Of course, if the rigid mould members 1 and 2 were permitted to conform to the reentrant portions without filling, the sculpture would be impossible to demould in extreme cases.

The mould assembly is provided with an insulative cover 25 which is adapted to seat on the flange 22 of the liner 18 to prevent the ice sculpture from freezing from the top down.

In use, the mould assembly is generally configured such that the top of the mould assembly corresponds to the base of the finished sculpture. The mould members 1 and 2 are assembled around the liner 18 such that the lips 20 and 21 are clamped between the peripheral flanges 3 and 4 of the mould members 1 and 2, and such that the flange 22 of the mould liner 18 lies flat on the flanges 5 and 6 of the mould members 1 and 2. The nuts 8, bolts 10 and washers 9 are installed through the holes 7 corresponding in position to the lips 20 and 21 and are tightened to seal the lips together against the leakage. If desired, the lips 20 and 21 can be smeared on their mating faces with a food grade sealant such as margarine to ensure water tightness.

The mould assembly is then supported in the cradle 17 such that its top flanges 5 and 6 lie in a substantially horizontal plane. The mould assembly is then filled with water to a level allowing for expansion on freezing, and the insulative cover 25 is installed on the flange 22 of the liner 18. The assembled and filled mould is then presented to a freezing environment and allowed to freeze solid.

When the sculpture is frozen, it is demoulded by removing the cover 25, removing the mould assembly from the cradle 17, inverting the mould assembly such that the surface of the ice exposed at the top is resting on a suitable support and then removing the fixing means to enable the complementary mould members 1 and 2 to be separated from the liner 18. When the foam inserts 24 (if any have softened sufficiently to permit, the mould liner 18 is parted at the split 19 and peeled off the sculpture.

Particular advantages of this embodiment over the moulds disclosed in the prior art and especially U.S. Pat. No. 466,927 include the provision of the split 19, provision of the resilient fixing means (11, 12, 13 and 14), and provision of the foam inserts 24, in addition to the stated advance over the prior art generally of selectively varying the rate of heat transfer.

Firstly, the presence of the split 19 enable the mould liner 18 to be made thicker than the corresponding liner of U.S. Pat. No. 4,669,271, whilst improving the demouldability of the sculptures. The advantage lies in the resistance of the thicker liner to tearing, relative to the thinner liner, resulting in improved liner life. Also, the presence of the split 19 enables more complex shapes to be moulded without having to have recourse to the pleats specified for the envelope of U.S. Pat. No. 4,669,271, which pleats detract from the finish and detail of the ice sculpture.

Secondly, the resilient fixing means of the present embodiment permits expansion of the ice laterally whereas the ice moulds of U.S. Pat. No. 4,669,271 only permit the expansion of the ice through the open top of the mould. The advantage in this difference is that the present mould has reduced tendency to accumulate stresses generally, whilst retaining superior detail transfer from the linear to the sculpture.

Thirdly, the moulds of U.S. Pat. No. 4,669,271 are incapable of moulding ice sculptures which have reentrant regions, since the thin envelope is conformed to by the sidewalls irrespective of the profile of the sculpture. For example, it would be impossible to use the moulds of U.S. Pat. No. 4,669,271 if it were required to mould a sculpture having reentrant impression where the opening of the impression were smaller than the dimension of the impression, since such a sculpture would be impossible to demould. The rigid sidewall corresponding to the impression would be effectively locked into the ice. The present embodiment on the other hand, by its provision of the foam inserts 24, enables such impressions to be moulded since the mould members 1 and 2 do not have to enter the impression.

Whilst the above is given by way of illustration of the present invention, nothing in that illustration should be taken to limit the broad scope and ambit of the invention as defined in the following claims.

We claim:

1. A mould assembly for molding ice sculpture comprising:
   complementary mould members defining an open top mould cavity;
   a water impervious flexible mould liner conforming to the interior of the cavity; and
   a thermally insulating cover adapted to close the open top of the cavity; wherein said mould members comprise a plurality of perforations in the mould members at protuberant portions of the mould cavity.

2. A mould assembly in accordance with claim 1, wherein there is provided thermal insulation at narrow portions of the mould cavity.

3. A mould assembly in accordance with claim 2 wherein the complementary mould members are made from a thermally insulating material.

4. A mould assembly in accordance with claim 2 wherein the mould liner is comprised of a natural rubber latex material.

5. A mould assembly in accordance with claim 4 wherein areas of the mould liner corresponding to reentrant portions of the sculpture comprise inserts of foam material encapsulated in the latex material, the foam material being of lower specific heat than the latex material.

6. A mould assembly in accordance with claim 1 wherein the complementary mould members are made from a thermally insulative material.

7. A mould assembly in accordance with claim 1 wherein the complementary mould members are provided with complementary flanges, the mould members being removably attached to each other via fixing means operating to retain the flanges in abutment.

8. A mould assembly in accordance with claim 7 wherein the mould linear comprises a split region around at least part of its periphery to facilitate removal of the mould liner from the ice sculpture, whereby mating lips of the split region are held in sealing engagement by clamping between adjacent mould members.

9. A mould assembly in accordance with claim 8 wherein the fixing means comprises rigid fixing means at the split region and resilient fixing means elsewhere, the resilient fixing means being such that the mould assembly can expand in response to expansion of the ice up freezing.

10. A mould assembly in accordance with claim 9 wherein each of the resilient fixing means comprises a nut and bolt assembly passing through the complementary flanges and having at least one spring interposed between the nut or bolt and the complementary flanges.

11. A mould assembly in accordance with claim 1 wherein the open top of the cavity is rimmed by a top flange, said top flange in use being in abutment with a corresponding flange portion of the mould liner.

12. A mould assembly in accordance with claim 1 wherein the mould liner is comprised of a natural rubber latex material.

13. A mould assembly in accordance with claim 12 wherein areas of the mould liner corresponding to reentrant portions of the sculpture comprise inserts of foam material encapsulated in the latex material, the foam material being of lower specific heat than the latex material.

14. In a mould assembly for moulding ice sculpture having
   (i) complementary mould members of thermally insulating material, the complementary mould members being releasably mated together via complementary peripheral flanges having fixing means therethrough, defining an open topped mould cavity,
   (ii) a water impervious flexible mould liner conforming to the interior of the cavity and comprising a split region around at least part of its periphery, having mating portions, each of the mating portions having extended lips adapted to be sealingly clamped together between adjacent mould members, and (iii) a thermally insulating cover adapted to close the open top of the mould cavity, the improvement comprising:
 (a) perforations through the mould members at regions corresponding to protuberant parts of the ice sculpture to increase the rate of freezing of the protuberant parts, and
 (b) thermal insulation in the mould assembly at regions corresponding to narrow parts of the ice sculpture to decrease the rate of freezing of the narrow parts.

15. A mould assembly for moulding ice sculpture comprising:
 complementary mould members defining an open top mould cavity;
 a water impervious flexible mould liner conforming to the interior of the cavity; and
 a thermally insulating cover adapted to close the open top of the cavity;
 wherein areas of the mould linear adjacent to reentrant portions of the mould cavity comprise inserts of a material encapsulated in the material of the liner, the insert material being of lower specific heat than the liner material.

16. A mould assembly according to claim 15 wherein there is provided thermal insulation at relatively narrow portions in the mould cavity.

17. A mould assembly according to claim 16 wherein the complementary mould members are made from a thermally insulated material.

18. A mould assembly according to claim 16 wherein the mould liners comprises a natural rubber latex material.

19. A mound assembly according to claim 18, wherein there is provided a plurality of perforations in the mould members at protuberant portions of the mould cavity.

20. A mould assembly according to claim 15 wherein the complementary mould members are made from a thermally insulative material.

21. A mould assembly according to claim 15 wherein the complementary mould members are provided with complementary flanges, the mould members being removably attached to each other via fixing means operating to retain the flanges in abutment.

22. A mould assembly according to claim 21 wherein the mould liner comprises a split region around at least part of its periphery to facilitate removal of the mould liner from the ice sculpture, whereby mating lips of the split region are held in sealing engagement by clamping the adjacent mould members.

23. A mould assembly according to claim 22 wherein the fixing means comprises rigid fixing means at the split region and resilient fixing means elsewhere, the resilient fixing means being such the mould assembly can expand in response to expansion of the ice upon freezing.

24. A mould according to claim 23 wherein each of the resilient fixing means comprises a nut and bolt assembly passing through the complementary flanges and having at least one spring interposed between the nut or bolt and the complementary flanges.

25. A mould assembly according to claim 15 wherein the open top of the cavity is rimmed by a top flange, said top flange in use being in abutment with the corresponding flange portion of the mould liner.

26. A mould assembly according to claim 15 wherein the mould liner is comprised of a natural rubber latex material.

27. A mould assembly according to claim 26 wherein said insert material is foam.

28. In a mould assembly for moulding ice sculpture including:
 complementary mould members of thermally insulating material, the complementary mould members being releasably mated together via complementary peripheral flanges having fixing means therethrough, defining an open-top mould cavity;
 a water impervious flexible mould liner conforming to the interior of the cavity and comprising a split region around at least part of its periphery and having mating portions, each of the mating portions having extended lips adapted to be sealingly clamped together between adjacent mould members; and
 a thermally insulating cover adapted to close the open top of the mould cavity, the improvement comprising providing areas of the mould liner corresponding to re-entrant portions of the mould cavity with inserts of material encapsulated in said liner, the insert material being of lower specific heat than the material of said liner.

29. A mould assembly for moulding ice sculpture, comprising;
 complimentary mould members defining an open top cavity;
 a water impervious flexible mould liner comprised of a natural rubber latex material conforming to the interior of the cavity; and
 a thermally insulating cover adapted to close the open top of the cavity;
 wherein area of the mould liner corresponding to reentrant portions of the sculptured comprise inserts of foam material encapsulated in the latex material, the foam material being of lower specific heat than the latex material.

* * * * *